Feb. 26, 1952     E. M. WILLIAMS ET AL     2,586,894
RADIO RECEIVER

Filed Oct. 5, 1944     4 Sheets-Sheet 3

INVENTOR.
BENJAMIN R. GARDNER Jr
EVERARD M. WILLIAMS
BY
William D. Hall
ATTORNEY Feb. 26, 1952 E. M. WILLIAMS ET AL 2,586,894
RADIO RECEIVER Filed Oct. 5, 1944 4 Sheets-Sheet 4

INVENTOR.
BENJAMIN R. GARDNER JR.
EVERARD M. WILLIAMS
BY

ATTORNEY

Patented Feb. 26, 1952

2,586,894

UNITED STATES PATENT OFFICE 2,586,894

RADIO RECEIVER

Everard M. Williams, Ellwood City, and Benjamin R. Gardner, Jr., State College, Pa., assignors to the United States of America as represented by the Secretary of War Application October 5, 1944, Serial No. 557,348

8 Claims. (Cl. 250—20)

(Granted under the act of March 3, 1883, as amended April 30, 1928; 370 O. G. 757)

The invention described herein may be manufactured and used by or for the Government for governmental purposes, without the payment to us of any royalty thereon.

This invention concerns a radio receiver and more particularly a combination of a broad-band panoramic receiver used in combination with a narrow-band receiver that comprises both an oral or listening unit and a panoramic unit which are used together for analyzing signals.

The objects of the present invention include the provision of an automatic wide frequency range panoramic search receiver that combines a low range band with a high range band that is superimposed one upon the other or brought into registration with each other upon a cathode ray tube screen that is calibrated in megacycles and which receiver makes use of both its image frequency and its normal frequency by novel methods of mixing signals together with means for determining whether an incoming signal is above or below the heterodyne signal, together with a narrow-band analyzing receiver that, together with the wide-band panoramic search receiver serves to locate and analyze intercepted or victim signals that appear upon the wide band panoramic search receiver.

Figure 1:
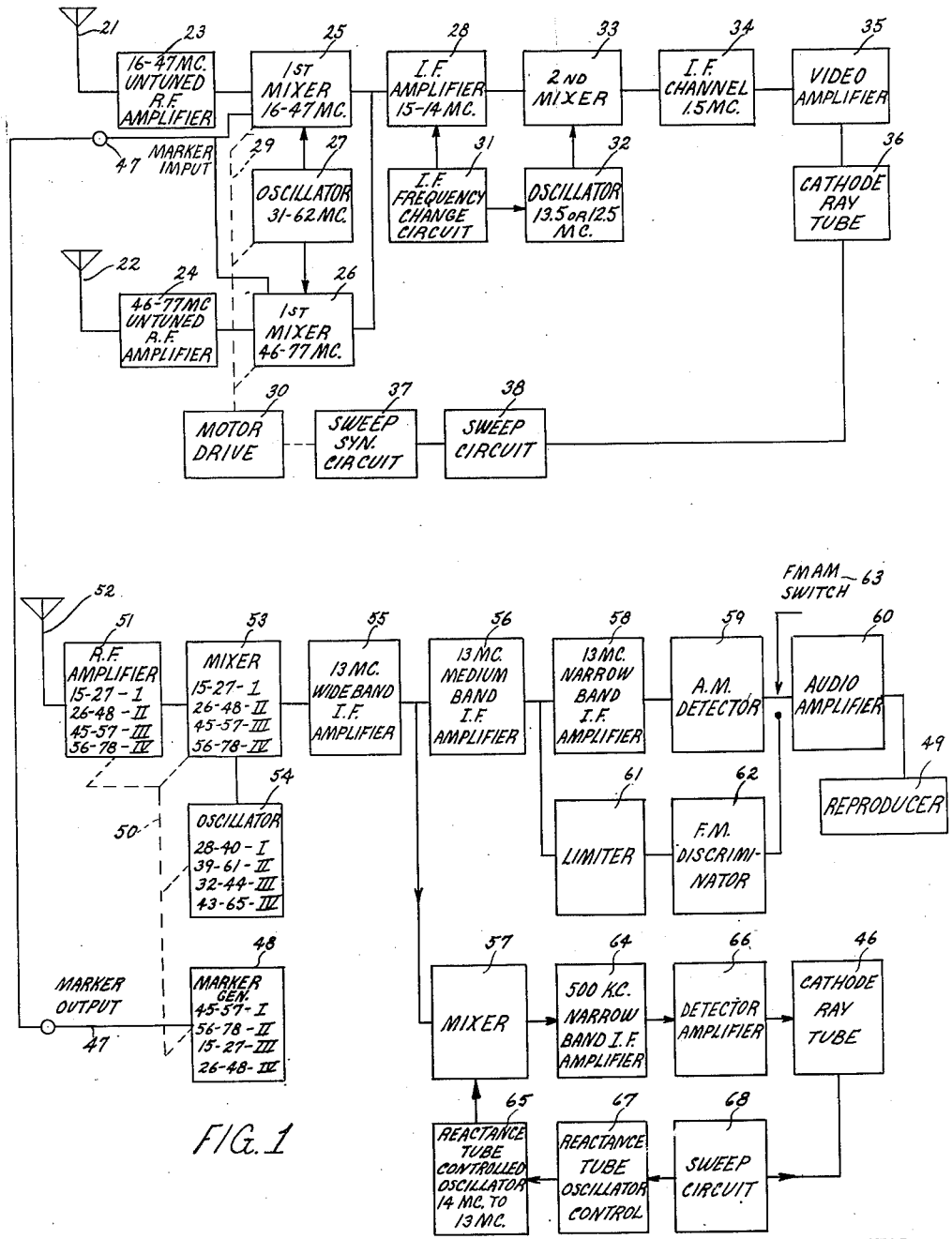

With the above and other objects in view which will be apparent to those who are informed in the field of the reception and analysis of radio signals from the following discussion, illustrative embodiments of the present invention appear in the accompanying drawings wherein:

Figure 1 is a block diagram of my invention; and

Figure 2:
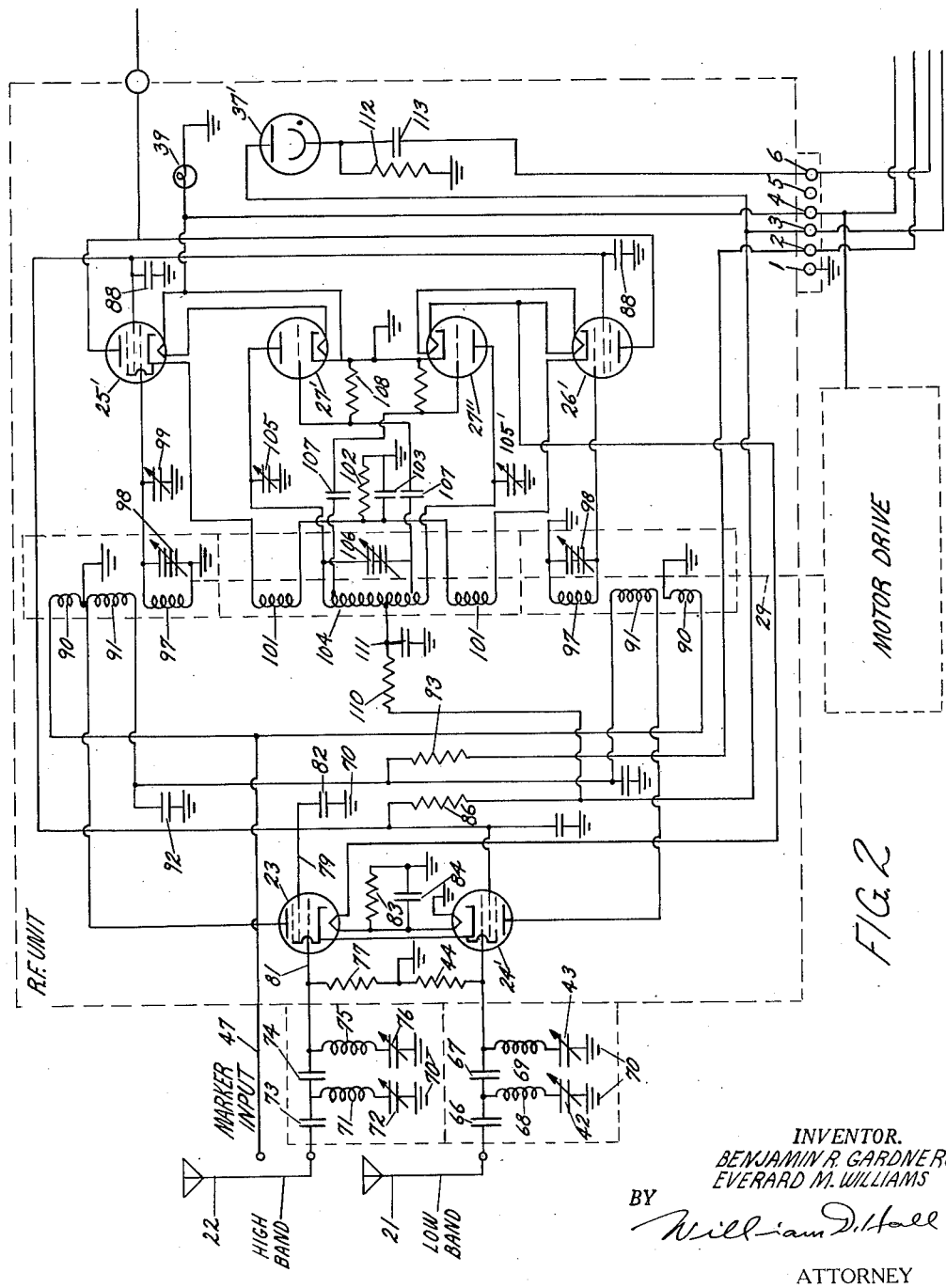
Figure 3:
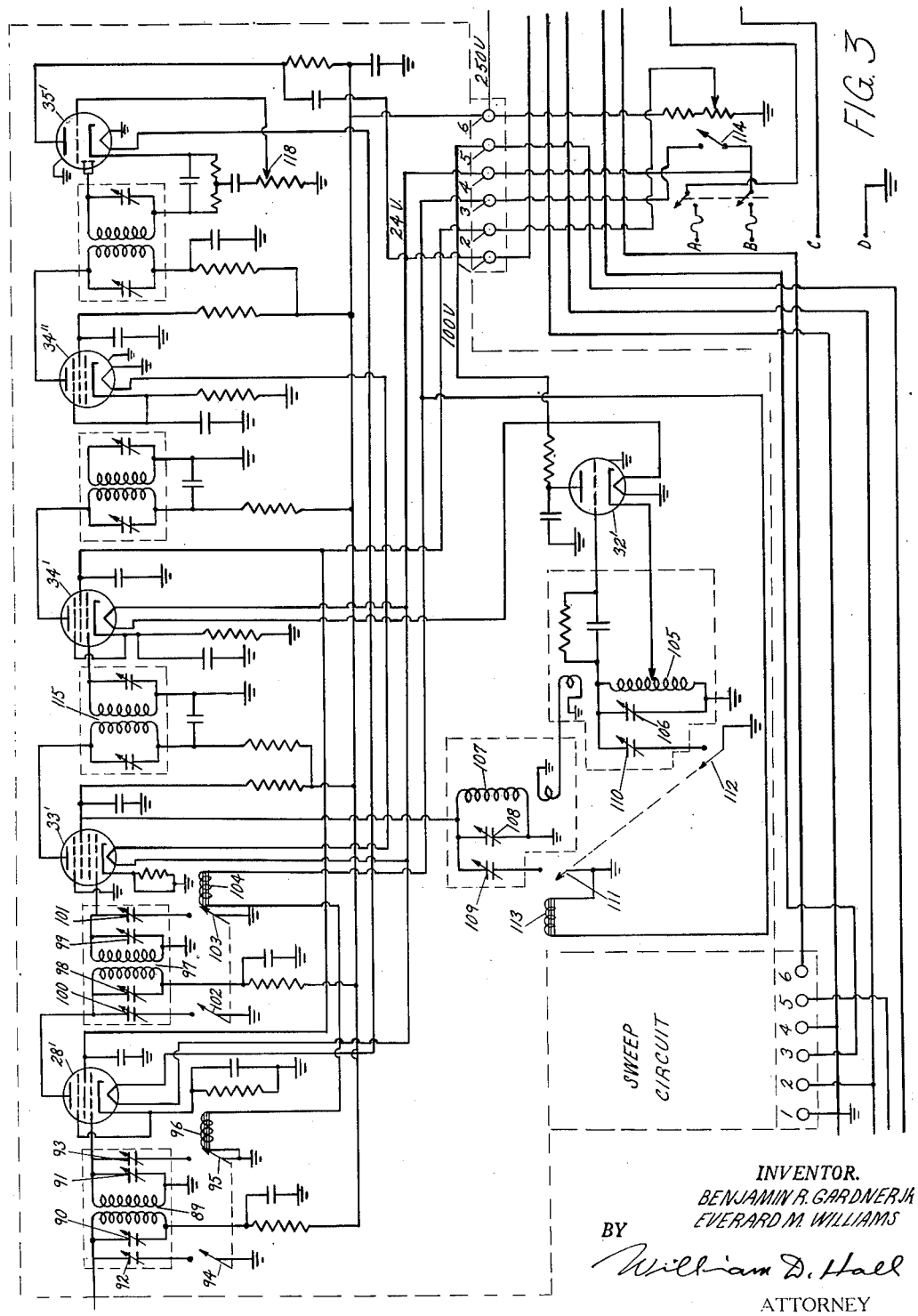
Figure 4:
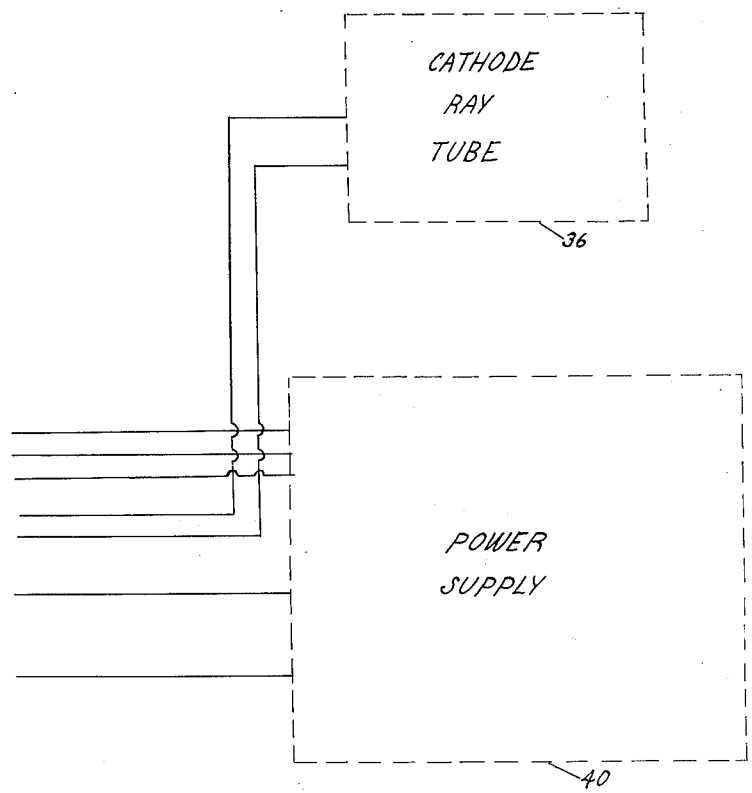

Figures 2, 3 and 4 present the novel parts of the panoramic search receiver in circuit diagram form and the conventional parts thereof in block diagram form.

The wide-band panoramic search receiver that is shown in the upper portion of Figure 1 of the drawings comprises an automatic wide frequency range panoramic search receiver that preferably has two separate antennas 21 and 22. The antenna 21 feeds to a low range or a low-frequency band part of the search receiver and the antenna 22 feeds to a high-frequency band part of the search receiver. The antenna 21 feeds to an untuned radio frequency amplifier 23 of a chosen low-frequency range such as the range between 16 and 47 megacycles, as shown. The antenna 22 feeds to an untuned radio frequency amplifier 24 of a supplemental higher range such as the frequency range of 46 to 77 megacycles, as shown.

The amplifier 23 feeds into a mixer 25 and the amplifier 24 feeds into a mixer 26. The mixers 25 and 26 are both supplied from a common local oscillator 27 that is of a related frequency range such as, for example, the range of from 31 to 62 megacycles, as shown.

The mixers 25 and 26 and the oscillator 27 are simultaneously variably tuned by a ganged condenser assembly that is indicated by the dotted lines 29. The ganged condenser assembly 29 is driven by a motor 30. In the ganged condenser assembly, one condenser unit tunes the mixer circuit 25 while another condenser unit simultaneously tunes the mixer circuit 26 and a third condenser assembly tunes the oscillator 27. This condenser effect is accomplished by preferably using a type of mechanically balanced condenser wherein pairs of rotor condenser plates are disposed upon diametrically opposite sides of the condenser shaft so that they counterbalance each other during rotation. Three of these condenser sections are used and each section differs in the number of rotor and stator plates from those of the other condenser sections in order to cover differences in frequency ranges. The condenser rotors are cut to individual frequency ranges.

In the example chosen, the mixer 25 tunes over a frequency band of from 16 to 47 megacycles which, combined with the oscillator frequency of 31 to 62 megacycles, that is concurrently variably tuned with the mixers 25 and 26, provides normally a frequency difference of 15 megacycles that is fed into the intermediate frequency amplifier 28. In a corresponding manner, mixer 26 tunes over a frequency band of from 46 to 77 megacycles which, mixed with the variable tuned oscillator frequency of 31 to 62 megacycles, similarly gives normally a frequency difference of 15 megacycles fed into the intermediate frequency amplifier 28.

The outputs of both mixer circuits feed into a common intermediate frequency amplifier 28 that passes a frequency that is determined by the differences in frequency tuning between local oscillator 27 and the two mixers 25 and 26, and, in the cited example, normally 15 megacycles. Signals from the amplifier 28 are heterodyned in a second mixer 33 with signals from another local oscillator 32 and are converted into a 1.5 megacycle signal that is amplified in a second I. F. amplifier 34 and detected and further amplified in a video amplifier 35. The output from the video amplifier 35 is fed to opposed vertical plates of a cathode ray tube 36. The beat oscillator 32 normally is tuned to a frequency of 13.5 megacycles. An I. F. frequency change circuit 31 operates to change at will the pass frequency of the I. F. amplifier 28 from 15 megacycles to 14 megacycles and simultaneously to change the frequency of the beat oscillator 32 from 13.5 to 12.5 megacycles. This change is effectuated by the closing of a band discriminator switch 114 that is shown in Figure 4 of the drawing.

The triggering of a cathode ray tube sweep circuit 38 is assured by the use of a sweep synchronizing circuit 37 that is interposed between the motor drive 30 and the sweep circuit 38 which serves the cathode ray tube 36. The triggering of the cathode ray tube sweep circuit 38 is accomplished by the use of a slotted disc that is mounted upon the shaft of the condenser 29 with a light source on one side of the disc and a photo-electric tube or cell on the opposite side of the disc. The light source projects light through the slots in the disc to strike the photo-electric tube and thereby operate the circuit which triggers the sweep circuit 38. The output from the sweep circuit 38 is applied to the horizontal deflecting plates of the cathode ray tube 36.

With this arrangement the receiver will search over a total frequency band of from 16 to 77 megacycles. The frequency of the oscillator 27 is so varied automatically by the operation of the condenser driven by the motor 30 as to give a frequency difference of 15 megacycles impressed upon the I. F. amplifier 28 with a signal that is picked up over the search band of 16 to 77 megacycles.

The sweep of the cathode ray tube 36 is so triggered as to cause the ray to sweep across the scope once while the oscillator 27 covers the frequency range of 31 to 62 megacycles. In this manner the same scope may be used for panoramic indication over the entire frequency range of both the low band antenna 21 and the high band antenna 22.

Signals that are 15 megacycles higher or 15 megacycles lower than a particular oscillator frequency appear at the same point on the screen of the cathode ray tube 36, the screen of which is calibrated in megacycles. Both of the signal frequency scales of from 16 to 47 magacycles and from 46 to 77 megacycles are superimposed upon the cathode ray tube screen base line. The purpose of I. F. frequency change circuit 31 is to determine whether a given, observed signal on the cathode ray tube 36 belongs in the lower or in the upper frequency band. Closing the band discriminator switch 114 in the I. F. change circuit 31, the pass frequency of the I. F. amplifier 28 and the oscillation frequency of the oscillator 32 are both depressed to 14 megacycles and 12.5, respectively. This has the effect of making all lower band signals move toward the lower frequency end of the scale on the calibrated screen of the cathode ray tube 36 and, correspondingly, signals in the upper band move toward the high frequency end of the scale.

The described type of search receiver has the advantage of eliminating the image effect without requiring a tuned radio frequency amplifier ahead of the oscillator 27 as is ordinarily used. The present arrangement substitutes for the tuned radio frequency amplifier that is customarily used, untuned radio frequency amplifiers 23 and 24 to suppress the oscillator radiation from the receiver. The present arrangement has the further advantage of providing an increased range of signals that are received as well as eliminating the ambiguity that is due to image effect.

A second component of the device is shown in the lower portion of Figure 1 of the drawing. This component is a normal, narrow band, super-heterodyne, panoramic receiver with an associated reproducer 49 that preferably is a listening receiver. The purpose of the narrow band, panoramic receiver is to examine in detail any selected portion of the spectrum that is covered by the wide band, panoramic receiver, and also to listen to any signal selected from those presented by the wide band, panoramic receiver. In order to cover the full range of the wide band, panoramic receiver, the analyzing receiver operates in four separate bands, as shown in the drawing. A change from one band to another is effected by means of a band switch, not shown. Tuning within a particular band is effected by means of a manually operated, ganged control 50, which controls the tuning of a radio frequency amplifier 51, a local oscillator 54, and a mixer 53. The radio frequency amplifier 51 receives its signal from an antenna 52. The frequency ranges that are covered by each of the above elements, namely, the radio frequency amplifier, local oscillator 54, and the mixer 53 are designated in the diagram by Roman numerals. The output of the mixer 53 feeds into a fixed frequency wide band I. F. amplifier 55 with a pass frequency of 13 megacycles. The output of this amplifier is divided into channels. One channel is a normal FM-AM listening receiver comprising a medium band I. F. amplifier 56, a narrow band I. F. amplifier 58, an audio-modulated detector 59, a limiter 61, a frequency-modulated discriminator 62, a FM-AM switch 63, an audio amplifier 60, and a phone 49.

The second channel for the output of the wide-band amplifier 55 is fed to a normal narrow-band panoramic receiver which comprises the following components. The input to the mixer 57, from the 13 megacycle, wide band, intermediate frequency amplifier 55, is converted in frequency by the reactance tube controlled oscillator 65 and presented as an output to the 500 kc. intermediate frequency amplifier 64. The output of the 500 kc. intermediate frequency amplifier 64 is fed into a detector unit 66 and then to the cathode ray tube 46. Since the reactance tube-controlled oscillator is continuously being frequency-modulated from 13 megacycles to 14 megacycles, any signals appearing at the input to the mixer 57 within the frequency range of 12.5 megacycles to 13.5 megacycles will be converted in frequency to 500 kc. when the reactance tube-controlled oscillator 65 reaches a corresponding frequency of 500 kc. greater than the incoming signal frequency. A sweep circuit 68 is a self-controlled unit and supplies sweep voltage to both the cathode ray tube 46 and to the reactance tube 67. The reactance tube 67, in turn, frequency modulates the oscillator 65.

The analyzing receiver also includes a marker generator 48. This generator 48 covers the whole frequency range of the analyzing receiver in four bands that are indicated by Roman numerals in the drawing. The band change switch of the receiver operates to change the bands of the marker generator 48. The tuning dial of the receiver also controls the tuning of the marker generator 48. The marker generator 48 feeds signals into the wide-band panoramic receiver by way of a connection 47. The signal output of the marker generator 48 is arranged to be the image frequency of a signal that is being received by the analyzing receiver with respect to the local oscillator of the wide-band panoramic receiver. By this means the tuning of the analyzing receiver is indicated by a pip in the cathode ray tube 36 of the broad-band panoramic receiver. Interference due to leakage from the marker signal is prevented from affecting the analyzing receiver because of the use of the image frequency as the marker signal, since the R. F. amplifier 51 is at all times detuned from the image frequency.

In operation, the sweep circuit 38 of the panoramic search receiver maintains continuously a base line upon the screen of the cathode ray tube 36 over the designated search band in the described manner. One or more signals that are picked up by the panoramic receiver antennas 21 and 22 appear as pips that elevate the base line on the cathode ray tube 36. The wide band panoramic receiver preferably sweeps the band rapidly, in the order of twenty times per second. For example, the screen of the cathode ray tube 36 is calibrated so that an approximate estimation of the frequency of an intercepted signal may be read directly thereon. Knowing the approximate signal frequency, as read upon the screen of the cathode ray tube 36, an operator may choose the proper radio frequency band upon the narrow band analyzing receiver that is shown in Figure 2 to include the intercepted signal. After the operator makes his choice of the proper radio frequency band for the intercepted signal, the marker signal will be observed as a marker pip upon the screen of the wide band panoramic receiver 36 that is shown in Figure 1. The analyzing receiver is then adjusted as to frequency until the marker pip is superimposed upon the intercepted signal tip. A final adjustment is then made by tuning on the intercepted signal which may then be observed upon the cathode ray tube 36, or listened to by the analyzing receiver that is shown in Figure 2 of the drawing.

The wide-band receiver makes use of the heterodyne image frequency, as well as the normal frequency. The method of mixing and distinguishing the intercepted signals in the upper and the lower bands are distinctive features of this circuit assemblage. The use of a double intermediate frequency system eliminates shifting the entire intermediate frequency units. In the described type of panoramic receiver, the intermediate frequency and the frequency coverage are related. The top frequency of the lower band must be below the top frequency of the oscillator 27 by a frequency that is equal to the intermediate frequency. The bottom frequency of the upper band must be above the bottom frequency of the oscillator by the same amount. The use of a second lower frequency I. F., for example, one and one half megacycles, permits more gain per stage as well as better control over the band width of the overall I. F. section. This band width is important as far as resolution and sensitivity are concerned.

The oscillator 27 is preferably of the push-pull type and has a reduced even harmonic content so that spurious responses due to beat between signal and harmonics are thereby minimized.

If it is impractical that the panoramic receiver that is shown in Figure 1 be provided with two antennas, a single antenna may be tapped into the two amplifiers 23 and 24, but the sensitivity of the circuit will be reduced by this change.

In the circuit diagram of the panoramic receiver part of the present invention, as shown in Figures 2-4 inclusive of the accompanying drawing, certain parts are shown in schematic form and the more conventional parts are shown in block diagram form.

In the circuit diagram the individual component tubes are indicated by primed numerals that correspond to the numerals that indicate the entire individual components in the block diagram.

In the circuit diagram the antenna 22 feeds into the untuned high band R. F. stage that employs an amplifier pentode 23'. In a similar manner the antenna 21 feeds into the untuned low band R. F. stage that employs an amplifier pentode 24'. The antennas 22 and 21 are coupled to the R. F. stages 23' and 24', respectively. The antenna 22 is coupled through fixed coupling condensers 73 and 74 which pass R. F. so that it may be impressed across grid inductors 71 and 75 thru tuning condensers 72 and 76, and also impressed across the grid resistor 77 leading to ground. The antenna 21 is coupled through a pair of coupling fixed condensers 66 and 67, which pass R. F. so that it may be impressed across the grid inductors 68 and 69 thru tuning condensers 42 and 43 and also impressed across a grid resistor 44.

The cathode circuits of the stages 23' and 24' are provided with a series resistor 83, which provides a cathode bias for both tubes while a condenser 84 serves to by-pass R. F. to ground. The outputs of the amplifiers 23' and 24' are transformer-coupled to the grids of the mixer stages 25' and 26', respectively. The push-pull oscillator tubes 27' and 27'' are transformer-coupled into the mixer tubes 25' and 26' through the cathode circuits of the latter. The marker input 47 feeds marker signal into the same circuit through a second pair of primary windings 96. The tuning of the local oscillator circuit is accomplished by a variable condenser 106. The tuning of the mixer circuits is accomplished by variable condensers 98. These are all ganged together on shaft 29 which is rotated by motor 30.

A manually variable trimmer condenser 99 provides compensation in the tuning of the condensers 98 so that proper bandspread and tracking is obtained.

A motor-driven slotted plate and light source causes a sequence of uniformly time-spaced flashes of light to strike a photo-electric cell 37' to provide a continuously triggered signal to control thru sweep circuit 38 the sweep of the cathode ray tube 36 in exact synchronism with the panoramic sweep.

The primary winding of a transformer 89 in Fig. 3 is tuned by a condenser 90. The transformer secondary is tuned by a condenser 91. Normally, the transformer 89 is tuned to a frequency of 15 megacycles. The condensers 92 and 93 are thrown in circuit by closing switches 94 and 95 under the action of a solenoid 96. These supplemental condensers 92 and 93 tune the transformer 89 to 14 megacycles. The secondary of the transformer 89 is connected to the grid of I. F. amplifier tube 28'. The plate circuit of the amplifier tube 28' is similarly connected by a transformer 97 to the grid of mixer tube 33'. The primary and the secondary windings of the transformer 97 are tuned to 15 megacycles by condensers 98 and 99. In the case of the transformer 97, the frequency is shifted to 14 megacycles by means of auxiliary condensers 100 and 101, which are thrown in circuit by switches 102 and 103 when actuated by a solenoid 104. A second beat oscillator 32' has its frequency determined by an inductance 105 and variable condenser 106. The oscillator 32' is link-coupled to the injector grid of mixer 33'. This injector circuit is also tuned by an inductance 107 and a condenser 108. Both of the foregoing tuned circuits are normally tuned to 13.5 megacycles but can be tuned to 12.5 megacycles by condensers 109 and 110. The condensers 109 and 110 are thrown in circuit by switches 111 and 112 which are operated by a solenoid 113. The solenoids 96, 104 and 113 are simultaneously operated by means of the band switch 114. This mechanism converts the second local oscillator 32' to 12.5 megacycles and the first intermediate frequency to 14 megacycles for the purpose of distinguishing between signals in the upper and in the lower bands, as hereinbefore described. The output of the second mixer 33' is transformer-coupled to a second I. F. amplifier 34' through the tuned transformer 115, the second I. F. amplifier 34' being 1.5 megacycles. The output tube 34' is transformer-coupled to the grid of the amplifier tube 34''. The output of the tube 34'' is transformer-connected to the diode section of the tube 35' where the second I. F. is rectified. Some amplification of the modulation envelope takes place in the triode section of the tube 35' and the output is fed to the plates of the cathode ray tube 36.

The receiving equipment which is disclosed herein comprises a broad band panoramic receiver, which permits a broad band of frequencies to be inspected visually on an oscilloscope screen for the presence of signals, in combination with a narrow band receiver and panoramic adapter for analyzing the signals. The signals appear as pips upon a frequency calibrated screen of the cathode ray tube 36 so that their frequencies may be readily determined.

The panoramic receiver part of the equipment is energized by a power supply 40 and comprises the local oscillator 27 of a superheterodyne receiver circuit. The tuning of the local oscillator 27 is swept mechanically from substantially 31 to 62 megacycles at the same time that the spot on the screen of cathode ray tube 36 makes one sweep. The rate of sweep is proportional to the rate of change in oscillator frequency between its lower and upper limits. The output voltage of the oscillator 27 is fed into the two mixer stages 25 and 26. The mixer stage 25 covers signals in the 16 to 47 megacycle range and the mixer stage 26 covers signals in the 46 to 77 megacycle range. A common 15 megacycle I. F. channel follows, then a second local oscillator 32 and 1.5 megacycle I. F. channel, after which the signals are rectified, amplified, and applied to the vertical plates of the cathode ray tube 36.

Signals that are 15 megacycles higher or 15 megacycles lower than a particular oscillator frequency appear at the same point on the screen of the cathode ray tube 36 and therefore the signal frequency scales of 16 to 47 megacycles and of 46 to 77 megacycles are superimposed upon the same baseline on the screen of the cathode ray tube 36. In order to distinguish between signals in the two bands the operator depresses a push-button band switch 114 on the instrument panel which energizes the solenoids 96, 104 and 113 to actuate the switches 94, 95, 102, 103, 111 and 112. The closing of the band switch 114 lowers the first oscillator 32 and the frequency of I. F. amplifier 28 by one megacycle, causing all of the signals in the low band of between 16 and 47 megacycles to move toward the low frequency end on the cathode ray tube screen base line and all of the high band of between 46 and 77 megacycles to move toward the high frequency end.

A signal pip standing near the center of the scale indicates an incoming signal either near 30 megacycles or near 60 megacycles. To determine which band the signal is in the band switch, button 114 is depressed. If the signal pip being observed moves toward the left, the incoming signal is either in the low band or the signal frequency is approximately 30 megacycles. If the observed pip moves toward the right, the signal is in the high band or the signal frequency is approximately 60 megacycles. If the trace appears to be distorted, particularly at the low-frequency end, it is probable that a stray radio frequency signal near the 14 to 15 frequency band of I. F. frequency is interfering. This is occasioned because the low Q, tuned grid mixer circuit provides a limited I. F. rejection. If this interference is persistent, a 14 to 15 megacycle filter may be interposed between each antenna and each antenna input connector.

The gain of the video amplifier 35' is adjusted by setting the I. F. gain control on the front panel to maximum gain and then adjusting the video gain control 118 to the maximum possible gain without the presence of objectionable noise "hash."

The amplifiers 23' and 24' receive incoming signals and serve to isolate the local oscillators 27' and 27'' from the antenna terminals and to reduce objectionable radiation from the antennas 21 and 22.

The push-pull oscillator comprising the tubes 27' and 27'' injects a signal voltage into each mixer tube 25' and 26'. The oscillator 27' and 27'' and mixer 25' and 26' circuits have ganged tuning condensers 106 and 98 that are driven by a motor 30'. On alternate quarter revolutions of the ganged condensers 106 and 98 the low-band mixer circuit sweeps from 47 to 16 megacycles; the high band mixer circuit sweeps from 77 to 46 megacycles; and the oscillator sweeps from 62 to 31 megacycles. The mixer and oscillator circuits are adjusted to track so that the low band mixer 26' is always 15 megacycles below the oscillator frequency and the high band mixer 25' is always 15 megacycles above the oscillator frequency.

A slotted disc is mounted on the gang-shaft 29 of the motor 30', and a lamp 39 and photo-electric tube 37' provide the trigger voltage for the sweep circuit. Each complete revolution of the gang-shaft 29 provides two triggering pulses. The pulses so provided are applied to the grid of the gas tube 37' and cause it to fire. Each time the tube 37' fires, it discharges a condenser in its plate circuit to produce a sawtooth wave. The sawtooth wave is applied to the plates of a sweep-shaping tube in the sweep circuit which clips off the positive peaks of the sawtooth waves in a manner well known in the art. This modified sawtooth wave is amplified and the output sweep voltage is applied to the horizontal deflection plates of the cathode ray tube 36. The time constant of this sweep circuit is such that the beam sweeps the cathode ray tube 36 twice with each revolution of the motor gang shaft 29. This time constant will substantially conform with the sweep frequency of the tuned mixers 25' and 26' and the push-pull oscillator 27' and 27''. The instantaneous position of the driven condensers in the tuned mixer circuits is proportional to the instantaneous horizontal deflection of the beam. Hence any signal that is presented at the receiver input within the frequency range of the receiver will appear as a pip at the point on the base line of the cathode ray tube screen that corresponds to the incoming signal frequency.

Assume that a 20 megacycle signal is present at the receiver input. The tuned mixer will accept the signal as it sweeps through 20 megacycles. At the same instant, the push-pull oscillator frequency is 35 megacycles.

The 35 megacycle and 20 megacycle signals are combined in the tuned mixer and their difference frequency, 15 megacycles, is passed by the high-frequency I. F. amplifier. A pip appears at the 20 and the 50 megacycle calibration line on the cathode ray screen.

In depressing the band discriminative switch 114, the intermediate frequency is changed to 14 megacycles. The tuned mixer will accept 20 megacycle signal voltage even when it is tuned to 19 megacycles. When the mixer is tuned to 19 megacycles, the push-pull oscillator is tuned to 34 megacycles. The 34 megacycles and 20 megacycle signals are combined in the mixer and their difference frequency, 14 megacycles, is passed by the high frequency I. F. amplifier. A pip appears on the cathode ray screen in a new position. The oscillator, in the course of its sweep cycle, is tuned to 34 megacycles before it is tuned to 35 megacycles. Since the cathode ray sweep is from low to high frequency and is synchronized with the oscillator sweep, the new pip appears somewhat displaced with respect to the position of the original pip, being nearer to the lower end of the scale. This displacement toward the low frequency end of the scale indicates that the received signal is in the low band and is 20 megacycles rather than 50 megacycles. Conversely, a pip resulting from a received signal on the high band will move to the high end of the scale when the band discriminator switch 114 is closed.

It is to be understood that the radio assemblage of components and circuits that are disclosed and described herein have been submitted for the purpose of illustrating and describing the present invention and that various substitutions and modifications may be made therein without departing from the scope of the present invention, as defined by the appended claims.

What we claim is:

1. A radio signal analyzing device comprising a broad band superheterodyne panoramic receiver and a second receiver, the panoramic receiver comprising a first radio frequency signal translating channel and a second radio frequency signal translating channel having a higher frequency range than said first channel, a cathode ray tube indicator connected to the outputs of said first and second channels, said second receiver comprising a plurality of radio frequency channels that collectively substantially cover the full range of said panoramic receiver, a marker generator connected to said broad band receiver, and means for simultaneously tuning said second receiver to the same frequency as said panoramic receiver and tuning said marker generator to the broad band receiver's image frequency of the frequency to which said second receiver is tuned.

2. The radio signal analyzing device defined in claim 1, wherein said panoramic receiver has a tunable local oscillator, and wherein the first and second channels of said panoramic receiver are tuned to frequencies respectively below and above the frequency of the local oscillator.

3. The radio signal analyzing device defined in claim 2, including means for distinguishing at will signals received in said first channel from signals received in said second channel on said cathode ray tube indicator.

4. A radio signal analyzing device, comprising a panoramic receiver having a radio frequency channel, a tunable first mixer circuit connected to said channel, a tunable first oscillator connected to said first mixer circuit, a visual presentation device connected to the output of said receiver, means for applying a time sweep voltage to said visual presentation device, means in said receiver for continuously tuning said mixer circuit and oscillator in synchronism with said time sweep voltage, a first intermediate frequency amplifier connected to said first mixer circuit, a second local oscillator, second mixer means connected to the output of said intermediate frequency amplifier and said second local oscillator, a second intermediate frequency channel connecting said second mixer means to said visual presentation device, and a frequency changing means connected to said first intermediate frequency amplifier and to said second local oscillator for changing the pass band of said first intermediate frequency amplifier and simultaneously changing the frequency of said second local oscillator.

5. The radio signal analyzing device defined in claim 4 including a radio frequency marker generator connected to said first mixer circuit, said marker generator and said radio frequency channel being tuned to frequencies lying on opposite sides of the frequency of said first oscillator.

6. A radio signal analyzing device, comprising a panoramic receiver having a channel tunable over a given radio frequency band, a tunable first mixer circuit in said channel, a first oscillator connected to said first mixer circuit, a visual presentation device connected to the output of said channel, means for applying a time sweep voltage to said visual presentation device, means in said receiver for continuously tuning said oscillator in synchronism with time sweep voltage, an intermediate frequency amplifier connected to said first mixer circuit, a second local oscillator, second mixer means connected to said intermediate frequency amplifier and said second local oscillator, a second intermediate frequency channel connecting said second mixer means to said visual presentation device, a radio frequency marker generator connected to the input of said first mixer circuit, said marker generator and said radio frequency channel being tuned to frequencies lying on opposite sides of the frequency of said first oscillator, and means for distinguishing at will the marker signal from a received signal on said visual presentation device.

7. A radio signal analyzing device, comprising a broad band superheterodyne panoramic receiver having a plurality of radio frequency channels, a tunable mixer circuit in each of said plurality of channels, a tunable oscillator connected to said first mixer circuits, the frequencies of at least two of said channels lying on opposite sides of the frequency of said oscillator, a visual presentation device connected to the output of said plurality of channels, means for applying a time sweep voltage to said visual presentation device, means in said receiver for continuously tuning said mixer circuits and oscillator in synchronism with said time sweep voltage, an intermediate frequency amplifier connected to each of said mixer circuits, and a frequency changing means connected to said intermediate frequency amplifier for changing the center frequency of the pass band of said intermediate frequency amplifier by a fixed predetermined amount.

8. The radio signal analyzing device defined in claim 7, including a radio frequency marker generator connected to each of said mixer circuits, and means for tuning said marker generator to the receiver's image frequency of a signal being received by said receiver.

EVERARD M. WILLIAMS.
BENJAMIN R. GARDNER, Jr.

REFERENCES CITED

The following references are of record in the file of this patent:

UNITED STATES PATENTS

| Number | Name | Date |
| --- | --- | --- |
| 2,063,534 | Wallace | Dec. 8, 1936 |
| 2,150,553 | Koch | Mar. 14, 1939 |
| 2,178,074 | Jakel et al. | Oct. 31, 1939 |
| 2,275,460 | Page | Mar. 10, 1942 |
| 2,312,203 | Wallace | Feb. 23, 1943 |
| 2,367,907 | Wallace | Jan. 23, 1945 |
| 2,381,940 | Wallace | Aug. 14, 1945 |
| 2,387,685 | Sanders | Oct. 23, 1945 |
| 2,416,346 | Potter | Feb. 25, 1947 |

FOREIGN PATENTS

| Number | Country | Date |
| --- | --- | --- |
| 834,082 | France | Aug. 1, 1938 |